Dec. 22, 1925.

F. CLARK

LOCK NUT

Filed April 30, 1925

1,566,830

WITNESSES

INVENTOR
Francisco Clark
BY
ATTORNEYS

Patented Dec. 22, 1925.

1,566,830

UNITED STATES PATENT OFFICE.

FRANCISCO CLARK, OF DURANGO, MEXICO.

LOCK NUT.

Application filed April 30, 1925. Serial No. 27,044.

*To all whom it may concern:*

Be it known that I, FRANCISCO CLARK, a citizen of Mexico, and a resident of Durango, in the Province of Durango and Republic of Mexico, have invented a new and Improved Lock Nut, of which the following is a description.

My invention relates to a novel means associated with a nut to cause the same to be locked against the accidental turning back of the nut.

The general object of the invention is to provide an improved device for the indicated purpose with a view to insure the locking of the bolt and to provide for a convenient release of the locking means for unscrewing the nut when desired.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1:
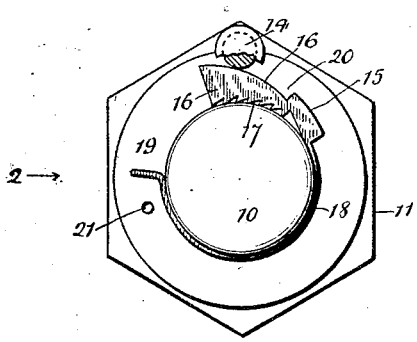
Figure 1 is a plan view of a bolt having thereon a nut provided with my improved locking means, a portion of a pin forming part of the invention being broken away.
Figure 2:
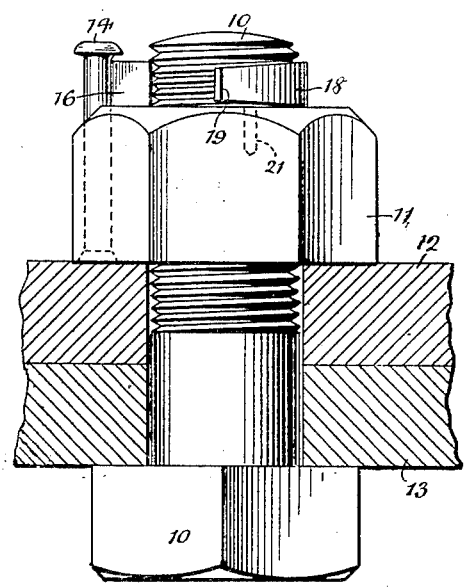
Figure 2 is a side elevation of a bolt and a nut embodying my invention, together with a fragment of two plates held clamped by the bolt and nut, said plates being shown in section, the view being taken looking in the direction of the arrow 2 at a side of Figure 1.

In the illustrated example of my invention, the numeral 10 indicates an ordinary bolt; 11, a nut equipped with my novel locking means as hereinafter explained; and 12 and 13 plates held clamped by the nut and bolt.

On the nut 11 a headed pin 14 is provided radially outward of the bore of the nut, said pin projecting from the rear face of the nut and held rigid with the nut. A locking device designated generally by the numeral 15 includes a locking head 16 having arcuate series of teeth 17 at its inner edge adapted to grip the bolt 10. Extending from an end of the head 16 is a bowed spring 18 adapted to partially encircle the bolt 10, said spring 18 having that end opposite the head 16 directed laterally outward at an angle to the body of the spring. The back edge or outer surface of the head 16 presents a notch 20. Said head presents a curved outer edge 16 extending from the end of the notch 20 to or adjacent to the free end of the head 16.

Figure 3:
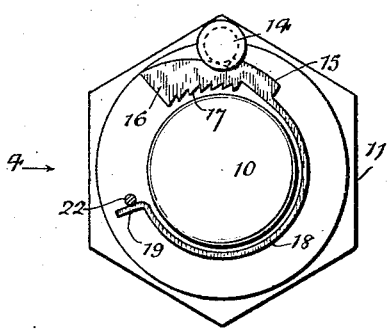
Figure 3 is a plan view of the bolt and nut showing the locking means on the nut in release position as compared with the locking position shown in Figure 1.
Figure 4:
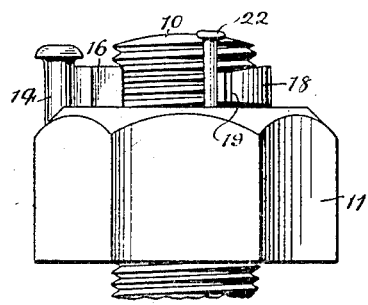
Figure 4 is a side elevation of the nut and a portion of the bolt with the locking means in release position as in Figure 3, the view being taken looking in the direction of the arrow 4 at a side of Figure 3.

The head 16 is adapted to be positioned between the bolt 10 and the pin 14 and the arrangement is such that with the pin 14 and head 16 being relatively so positioned that said pin is remote from the edge of the notch 20, the head is jammed between the pin and the bolt and the teeth 17 gripping the bolt threads. On the other hand, a partial turning of the locking device 15 about the bolt 10 will dispose the notch 20 adjacent to the pin 14 and thereby permit the expansion of the locking device 15 in a manner that the teeth 17 are clear of the bolt teeth permitting the nut to be turned back or unscrewed. In order to hold the locking device 15 in release position as shown in Figures 3 and 4 the end 19 is adapted to be engaged by a pin, nail, or the like, designated 22, which is adapted to be inserted in a pin hole 21 in the nut 11 which maintains the locking device 15 in the expanded position clear of the bolt as shown in Figures 3 and 4.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A lock nut having a threaded bore to receive a bolt, a headed pin on said nut at the rear face thereof, said nut having a pin hole remote from the headed pin, and a locking device comprising a head having teeth at the inner surface thereof adapted to grip the threads of the bolt, and a bowed spring extending from said head at one end and adapted to partially encircle the bolt, said head having a gradually reduced thickness from one end toward the opposite end and positioned adjacent to the headed pin to bear against the same to cause the pin to effect engagement of the teeth of said head with the threads of the bolt.

2. A lock nut having a threaded bore, a pin on the nut radially outward of the bore, and a locking device comprising a head having a toothed inner surface to grip a bolt, said head disposed adjacent to said pin, and a bowed spring extending from said head at one end and adapted to partially encircle a bolt.

3. A lock nut having a threaded bore, a pin on the nut radially outward of the bore, and a locking device comprising a head having a toothed inner surface to grip a bolt, said head disposed adjacent to said pin, and a bowed spring extending from said head at one end and adapted to partially encircle a bolt; together with means to hold the locking device in release position and away from the bore of the nut.

FRANCISCO CLARK.